US007729599B2

(12) United States Patent
Emde et al.

(10) Patent No.: US 7,729,599 B2
(45) Date of Patent: Jun. 1, 2010

(54) OPTIMIZED DETERMINATION OF THE AFTER-RUN VOLTAGE IN DC MOTORS

(75) Inventors: Christoph Emde, Leingarten (DE); Wolfgang Peveling, Backnang (DE); Gotthilf Koerner, Weissach (DE); Andreas Schmidtlein, Tamm (DE); Volker Weeber, Lauffen A.N (DE); Achim Noller, Stuttgart-Zuffenhausen (DE); Heiko Bock, Kreiensen (DE); Dirk Niemeyer, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 416 days.

(21) Appl. No.: 11/886,697

(22) PCT Filed: Jan. 25, 2006

(86) PCT No.: PCT/EP2006/050442
§ 371 (c)(1),
(2), (4) Date: Sep. 18, 2007

(87) PCT Pub. No.: WO2006/100139
PCT Pub. Date: Sep. 28, 2006

(65) Prior Publication Data
US 2009/0190904 A1    Jul. 30, 2009

(30) Foreign Application Priority Data
Mar. 22, 2005    (DE)    ........... 10 2005 013 143

(51) Int. Cl.
*H02P 7/29*    (2006.01)

(52) U.S. Cl. ............ 388/811; 318/599; 318/272
(58) Field of Classification Search .......... 318/599, 318/272, 293, 596, 663, 430, 431, 432, 433, 318/434; 388/811
See application file for complete search history.

(56) References Cited

U.S. PATENT DOCUMENTS 5,153,492 A * 10/1992 Landseadel ........... 318/599
5,811,947 A    9/1998 Hurst et al.

FOREIGN PATENT DOCUMENTS

| DE | 43 03 206 | 8/1994 |
|---|---|---|
| DE | 195 28 697 | 2/1997 |
| DE | 199 14 404 | 10/2000 |
| DE | 199 46 177 | 4/2001 |
| DE | 101 58 846 | 7/2003 |
| DE | 103 59 224 | 4/2005 |

* cited by examiner

*Primary Examiner*—Karen Masih
(74) *Attorney, Agent, or Firm*—Kenyon & Kenyon LLP

(57) ABSTRACT

A device and a method are provided for determining the after-run voltage of a direct current motor which is operated via cycled control. In normal operation the direct current motor is controlled via PWM control and a first specifiable pulse/no-pulse ratio. An evaluation unit is provided for determining an after-run voltage variable which is representative of the after-run voltage of the motor. Furthermore, for determining the after-run voltage variable the direct current motor is controlled via a specifiable, variable second pulse/no-pulse ratio.

10 Claims, 2 Drawing Sheets

Fig. 1
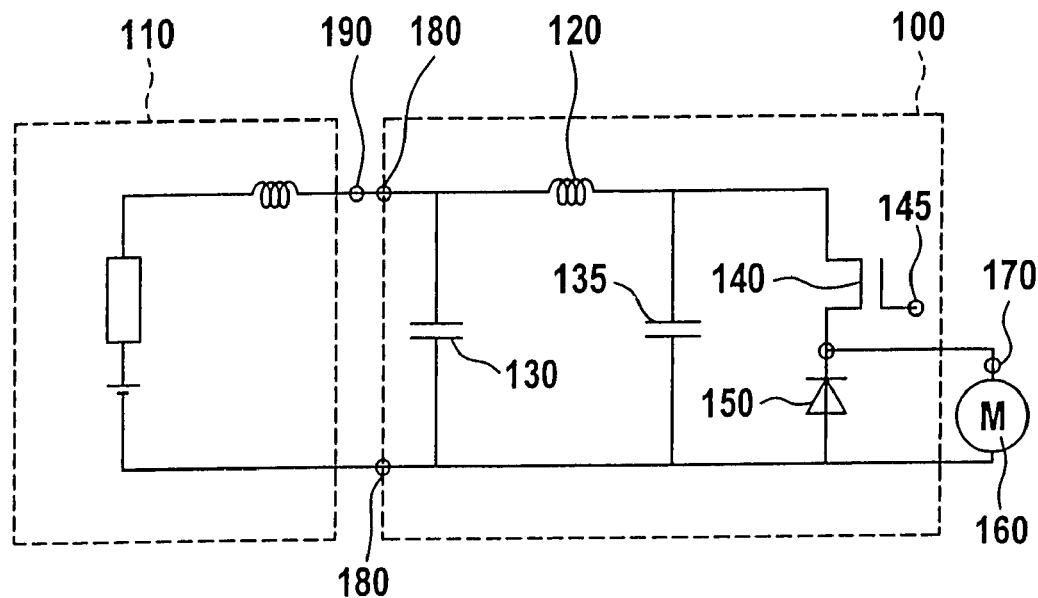
Fig. 2a
Fig. 2b
$I_{MOT}$
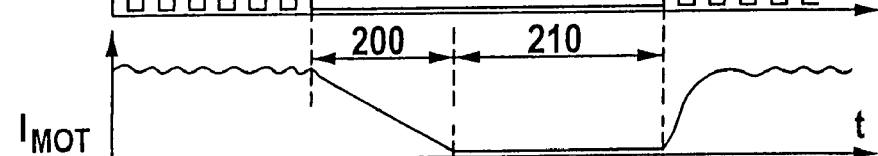
$t_{Decay}$
Fig. 2c
$U_{MOT}$
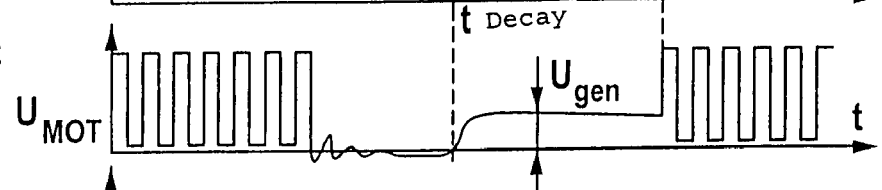
$U_{gen}$
Fig. 2d
$I_{Bat}$
Fig. 2e
$U_{Terminal}$
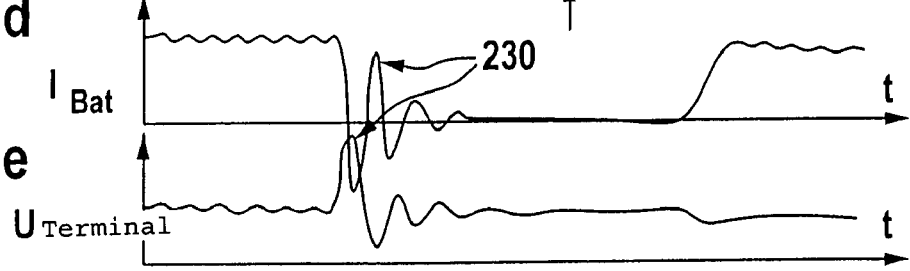

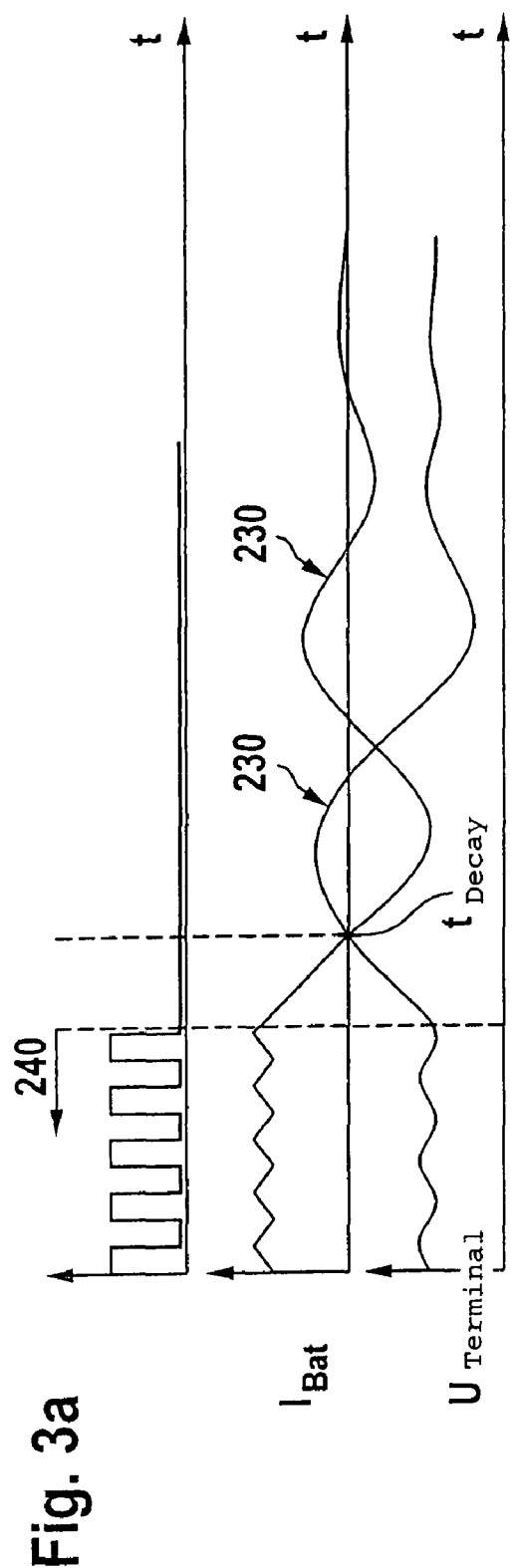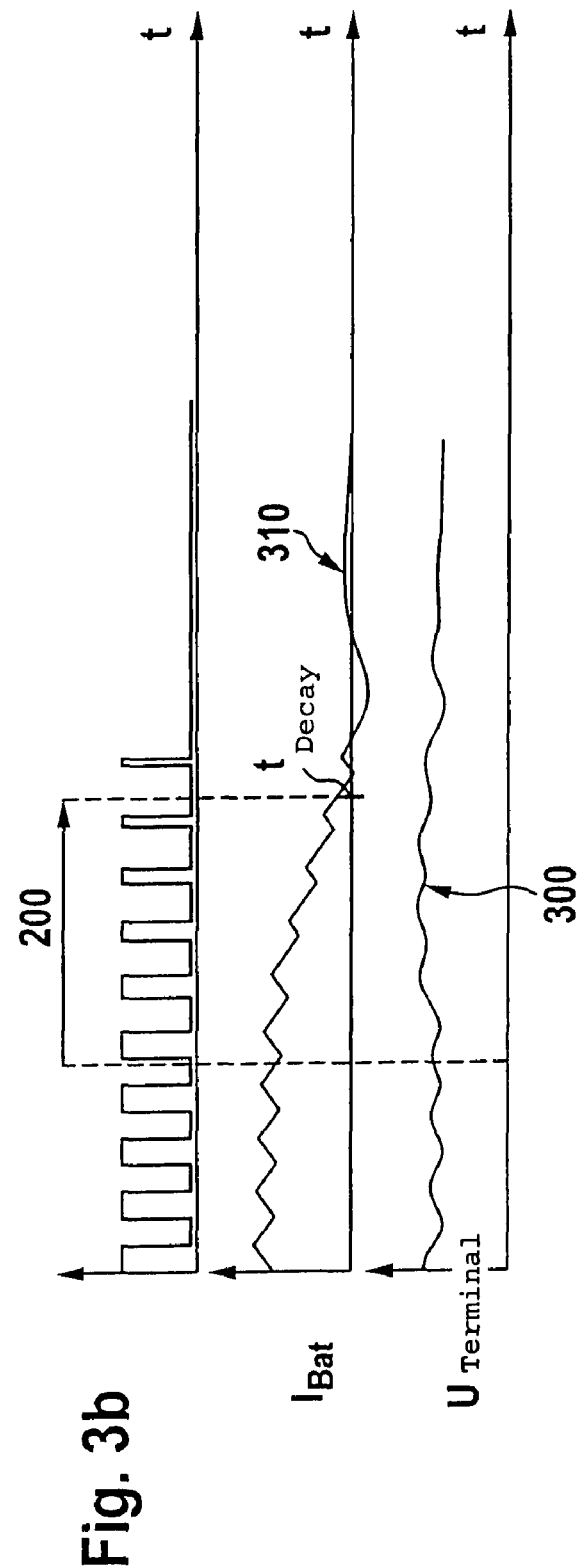

OPTIMIZED DETERMINATION OF THE AFTER-RUN VOLTAGE IN DC MOTORS

BACKGROUND OF THE INVENTION

1. Field of the Invention

The present invention relates to a device for determining the after-run voltage of a direct current motor, and a corresponding method.

2. Description of Related Art

For various applications it is necessary to determine the rotational speed of direct current motors. The rotational speed may be derived from the after-run voltage when the motor is controlled in a cycled manner. Thus, in published German patent document DE 199 14 404, for example, the after-run voltage of a pump motor in the uncycled no-pulse period is used to determine the rotational speed of the pump.

In published German patent document DE 195 28 697 a method is described in which a pressure variable is determined for a feed pump, for example in a brake system, on the basis of a variable that represents a measure of the rotational speed of the feed pump.

A method is described in published German patent document DE 199 46 177 for estimating an intake pressure between a master brake cylinder and an intake valve of a wheel braking cylinder in a motor vehicle brake system. The intake pressure is estimated, taking into account an after-run voltage of a motor, operable in a cycled manner, of a pump for conveying brake fluid.

Conventionally, the after-run voltage is usually determined via averaging instantaneous values of the motor voltage in the no-pulse period. This averaging is necessary because the generator after-run voltage is permeated via rather large interference signals as the result of brush sparking. The recording of the instantaneous values is controlled, for example, via clocking by a microprocessor, it being necessary to record multiple instantaneous values to obtain a measuring signal of sufficient quality since the dispersion of the instantaneous values may be very large. The rotational speed of the direct current motor is then computed from the average value thus obtained.

It is described in published German patent document DE 103 59 224 to wait for a specifiable first time period after the no-pulse period begins before starting the determination of the after-run voltage. In this manner, fluctuations which arise immediately after the no-pulse period begins as the result of current decay are masked.

A BRIEF SUMMARY OF THE INVENTION

The present invention provides a device and a method for determining the after-run voltage of a direct current motor which is operated via cycled control. In normal operation the direct current motor is controlled via PWM control and a first specifiable pulse/no-pulse ratio. An evaluation means is provided for determining an after-run voltage variable which is representative of the after-run voltage of the motor. Furthermore, for determining the after-run voltage variable, the direct current motor is controlled via a specifiable, variable second pulse/no-pulse ratio. The essence of the present invention is that the current applied to the direct current motor via the second pulse/no-pulse ratio is reduced to a lower value during a specifiable first time period $t_{decay}$, based on the current applied to the motor during the cycled control via the first specifiable pulse/no-pulse ratio.

Thus, via use of the present invention the object is achieved of minimizing interference produced as the result of parasitic inductivities and capacitances in the control unit and/or in the supply lines.

In one implementation of the present invention, the after-run voltage variable is determined following the control of the direct current motor via the second pulse/no-pulse ratio. Alternatively or optionally, the determination may also be made following the first time period. It is also possible to begin the determination when a specifiable threshold value is reached, the specifiable threshold value in particular being zero or essentially zero.

In one example embodiment of the present invention, the after-run voltage variable is determined during a second time period $t_{measurement}$. After the after-run voltage variable is determined, the control of the direct current motor generally returns to normal operation, i.e., the motor is controlled via the first pulse/no-pulse ratio. This may be the case, for example, following the second time period. Thus, the direct current motor is re-controlled via the first pulse/no-pulse ratio after a time period composed of $t_{decay}$ and $t_{measurement}$.

During the first time period the pulse width modulation (PWM) duty factor in the second pulse/no-pulse ratio is advantageously reduced from the controlled value (i.e., the pulse height) of the first pulse/no-pulse ratio to the threshold value. In one optional application of the present invention, this reduction occurs in a linear manner.

In a further example embodiment of the present invention, the time period for the pause control of the PWM duty factor in the second pulse/no-pulse ratio is continuously increased, i.e., prolonged, during the first time period. This increase may also occur, for example, in a linear manner.

BRIEF DESCRIPTION OF THE DRAWINGS

FIG. 1 schematically illustrates the circuitry of a direct current motor for high-frequency clocking.

FIGS. 2a through 2e show the variation over time of the voltage and current in the direct current motor and in the vehicle electrical system.

FIGS. 3a and 3b show a comparison between the related art and the application of the present invention after control via the first pulse/no-pulse ratio.

DETAILED DESCRIPTION

FIG. 1 schematically shows a circuit configuration used to provide high-frequency control of a (pump) motor, for example in the brake system of a motor vehicle. Starting from a vehicle electrical system 110, a control device 100 is provided which in turn operates direct current motor 160 in a cycled manner. Within control device 100, transistor 140 is controlled via a corresponding connection 145 for the cycled control of direct current motor 160. Coil 120 provided in control device 100 is intended to function as a filter, in conjunction with capacitor 130, to filter out fluctuations from the vehicle electrical system. To determine the after-run voltage, the motor voltage is usually measured in the supply path downstream from semiconductor switch 140. This is achieved using a voltage divider, which is illustrated as diode 150 in FIG. 1. Together with capacitor 135, the voltage divider represents a low-pass filter via which the after-run voltage may be processed for a corresponding evaluation. The processing typically occurs via use of an AD converter in a microprocessor, the signal being cyclically read in a cycle specified via the operating system (for example, 1 ms, 5 ms . . . ).

As shown in FIG. 1, the vehicle electrical system voltage, i.e., battery voltage, may be determined via terminals 180, and the battery current may be determined via a measuring or clamp terminal 190. A corresponding measuring device for determining the motor current is possible via a device 170.

The time diagrams in FIGS. 2a through 2e illustrate the cycled control of the direct current motor as known from the related art. The cycled control before and after the after-run voltage measurement is illustrated in FIG. 2a. As shown in the diagram in FIG. 2a, in normal operation 240 the motor is usually controlled in a cycled manner via equidistant pulses having a corresponding pulse length. FIG. 2b shows the current that flows through direct current motor 160. In region 200 it is apparent that motor current $I_{mot}$ drops after the cycled control is interrupted (current decay phase). Since no further control occurs, the motor current drops to a value that is essentially zero. This drop in the motor current occurs in a first time period $t_{decay}$. After the motor current decays, in a second phase 210 the after-run voltage $U_{gen}$ ($U_{gen}$=generator after-run voltage) is determined before the cycled control of the direct current motor is resumed. It is seen in FIG. 2c that the after-run voltage for the direct current motor is determined after the current decays inside region 210, i.e., within a second time period $t_{measurement}$.

After the cycled control of the direct current motor is switched off, fluctuations occur in the vehicle electrical system. Thus, current fluctuations as illustrated in FIG. 2c, or voltage peaks as illustrated in FIG. 2e, are seen immediately after the cycled control is switched off. This interference negatively influences the determination of the after-run voltage.

FIG. 3a shows the switching off of the cycled control in a magnified illustration. As previously described, in region 240 the direct current motor is initially controlled via equidistant pulses. The vehicle electrical system in the form of the battery current or the vehicle electrical system voltage shows the typical wave pattern corresponding to cycled control. After the cycled control is switched off, fluctuations occur in the battery current or in the vehicle electrical system voltage having current peaks or voltage peaks 230, respectively. The reason for these fluctuations is that the energy stored in the vehicle electrical system inductivity and the filter reactor dies down when the motor is switched off. This results in the internal vehicle electrical system LC oscillating circuit formed from the filter elements in the control device being excited, and in parasitic inductivities and capacitances in the supply line. This generates interference signals in the voltage which can be picked up at terminals 180, as well as in the current detected at measuring point 190.

To determine the generator after-run voltage with the least possible interference and without effects on the vehicle electrical system, in the present exemplary embodiment a controlled, i.e., retarded, decay of the vehicle electrical system current is achieved during the cycled control. Such a controlled decay of the vehicle electrical system current is shown, for example, with reference to the linear change in the PWM duty factor illustrated in FIG. 3b. The pulse length used during the cycled control is linearly reduced until the pulse length has been reduced to essentially zero. As illustrated in FIG. 3b, the current decay during phase 200 occurs in a cascaded fashion as a result of the linear reduction of the cycled control. After the cycled control has been completely switched off, only small fluctuations 310 remain, which have only slight effects on the determination of the after-run voltage. Also for the vehicle electrical system voltage, only a slight increase 300 is observed during the linear reduction of control. As the result of such a controlled decay of the vehicle electrical system current, it is possible to significantly reduce interference in the vehicle electrical system after the cycled control is switched off. After the after-run voltage is determined, the motor may immediately return to its normal operation while the cycled control originally used may be resumed.

In addition to the reduction in pulse length, as illustrated in FIG. 3b, in a further exemplary embodiment the interpulse pauses of this second pulse/no-pulse ratio may also be successively increased in region 240.

In a further exemplary embodiment, current $I_{mot}$ applied to motor 160 is compared to a specifiable threshold value. The after-run voltage is not determined until current $I_{mot}$ falls below the specified threshold value.

What is claimed is:

1. A device for determining an after-run voltage of a direct current motor having cycled control via a first specified pulse/no-pulse ratio, comprising:

at least one evaluation arrangement for determining an after-run voltage variable representing the after-run voltage of the motor, wherein, for determining the after-run voltage variable, the motor is controlled via a specifiable, variable second pulse/no-pulse ratio;

wherein a current applied to the motor via the second pulse/no-pulse ratio is reduced to a lower value during a specified first time period, based on a current applied to the motor during the cycled control via the first specified pulse/no-pulse ratio.

2. The device as recited in claim 1, wherein the after-run voltage variable is determined following at least one of:

the control of the motor via the second pulse/no-pulse ratio;

the specified first time period; and the reaching of a specified threshold value within a current decay phase during the specified first time period, wherein the threshold value is substantially zero.

3. The device as recited in claim 1, wherein the after-run voltage variable is determined during a second time period, and wherein the motor is controlled following the second time period via the first specified pulse/no-pulse ratio.

4. The device as recited in claim 2, wherein pulse-width-modulation duty factor in the second pulse/no-pulse ratio during the first time period is reduced from the first pulse/no-pulse ratio to the threshold value in a substantially linear manner.

5. The device as recited in claim 1, wherein a time period of pause control of pulse-width-modulation duty factor in the first pulse/no-pulse ratio is continuously increased during the first time period in a substantially linear manner.

6. A method for determining an after-run voltage of a direct current motor having cycled control via a first specified pulse/no-pulse ratio in normal operation, the method comprising:

determining an after-run voltage variable representing the after-run voltage of the motor, wherein, for determining the after-run voltage variable, the motor is controlled via a specifiable, variable second pulse/no-pulse ratio; and controlling the second pulse/no-pulse ratio in such a way that a current applied to the motor is reduced to a lower value during a specified first time period, based on a current applied to the motor during the cycled control via the first specified pulse/no-pulse ratio.

7. The method as recited in claim 6, wherein the after-run voltage variable is determined following at least one of:
   the control of the motor via the second pulse/no-pulse ratio;
   the specified first time period; and
   the reaching of a specified threshold value within a current decay phase during the specified first time period, wherein the threshold value is substantially zero.

8. The method as recited in claim 6, wherein the after-run voltage variable is determined during a second time period, and wherein the motor is controlled following the second time period via the first specified pulse/no-pulse ratio.

9. The method as recited in claim 7, wherein pulse-width-modulation duty factor in the second pulse/no-pulse ratio during the first time period is reduced from the first pulse/no-pulse ratio to the threshold value in a substantially linear manner.

10. The method as recited in claim 6, wherein a time period of pause control of pulse-width-modulation duty factor in the first pulse/no-pulse ratio is continuously increased during the first time period in a substantially linear manner.

* * * * *